March 29, 1949.　　　　J. ROBINSON　　　　2,465,485
HYDRAULIC DRIVE FOR HOISTS OR THE LIKE
Filed Jan. 25, 1947　　　　　　　　　　　　5 Sheets-Sheet 1
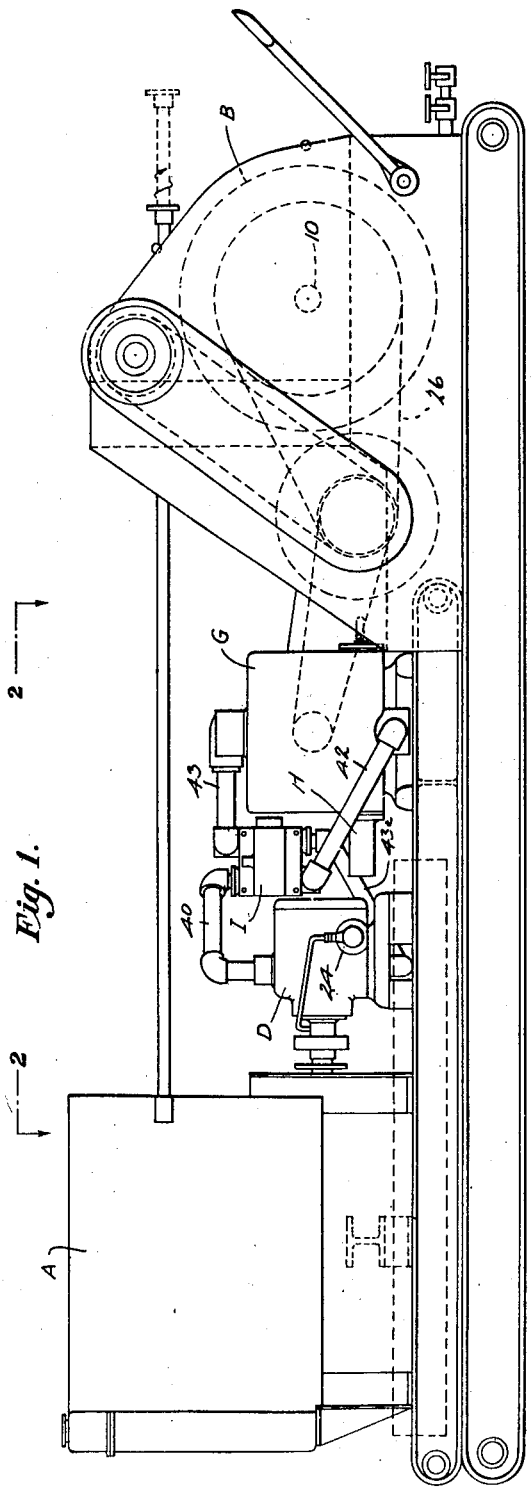
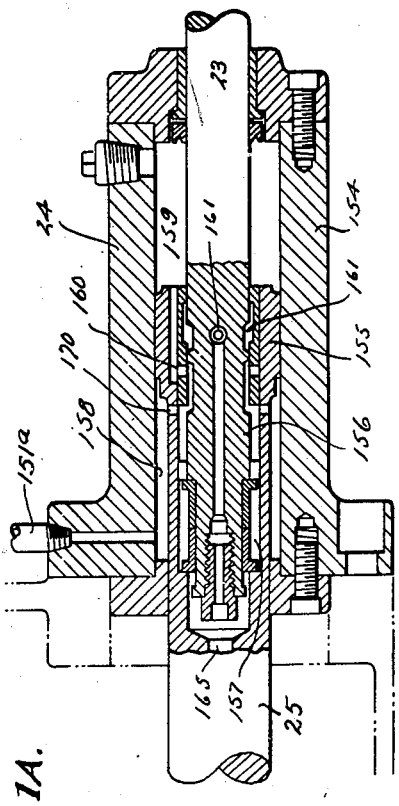
INVENTOR.
JAMES ROBINSON
BY
Ralph L. Tweedale
Attorney

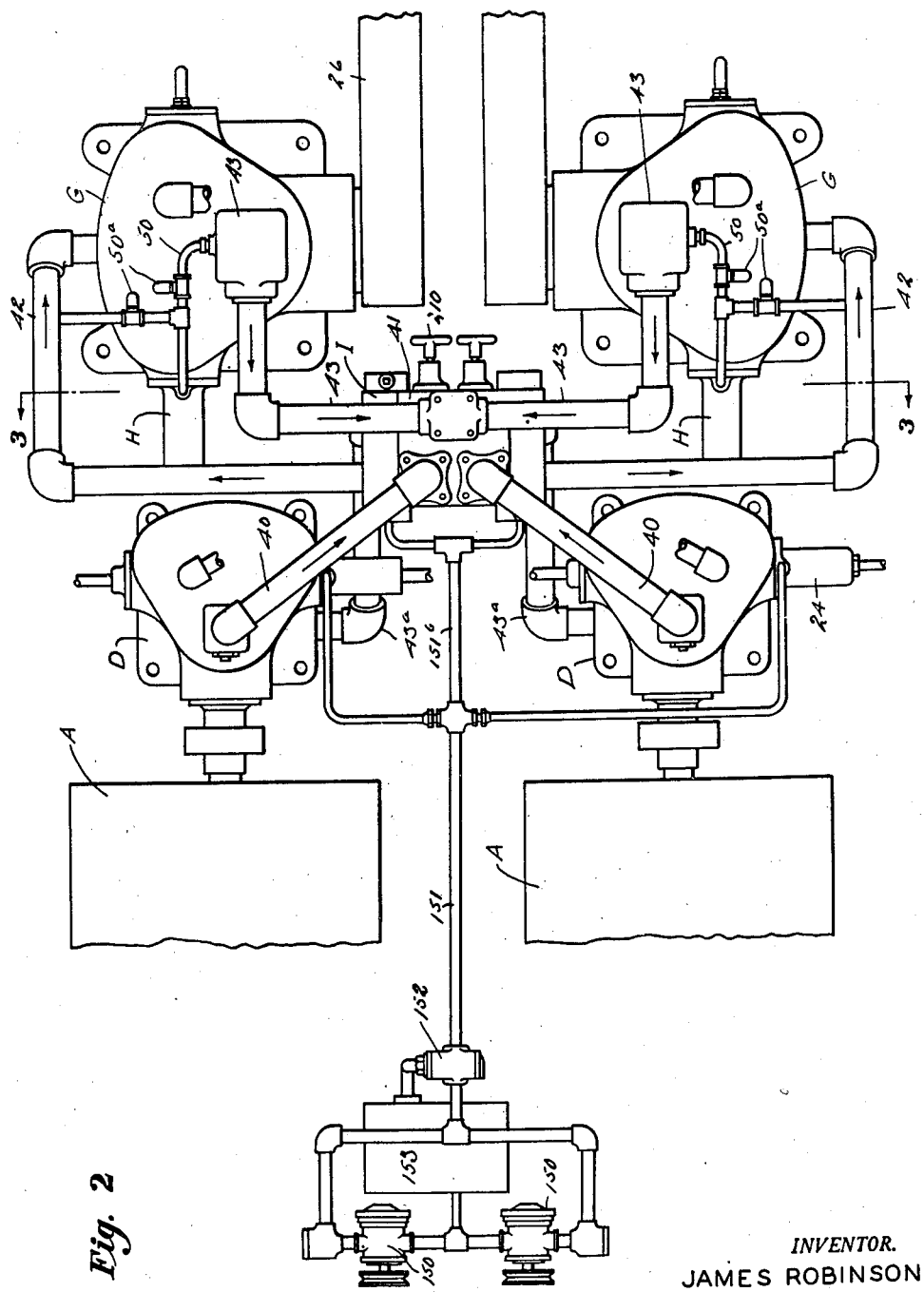

March 29, 1949.  J. ROBINSON  2,465,485
HYDRAULIC DRIVE FOR HOISTS OR THE LIKE
Filed Jan. 25, 1947  5 Sheets-Sheet 3

INVENTOR.
JAMES ROBINSON
BY
Ralph L. Tweedale
Attorney

March 29, 1949.  J. ROBINSON  2,465,485
HYDRAULIC DRIVE FOR HOISTS OR THE LIKE
Filed Jan. 25, 1947  5 Sheets-Sheet 4

Inventor
JAMES ROBINSON
BY Ralph L. Tweedale
Attorney

March 29, 1949. J. ROBINSON 2,465,485
HYDRAULIC DRIVE FOR HOISTS OR THE LIKE
Filed Jan. 25, 1947 5 Sheets-Sheet 5
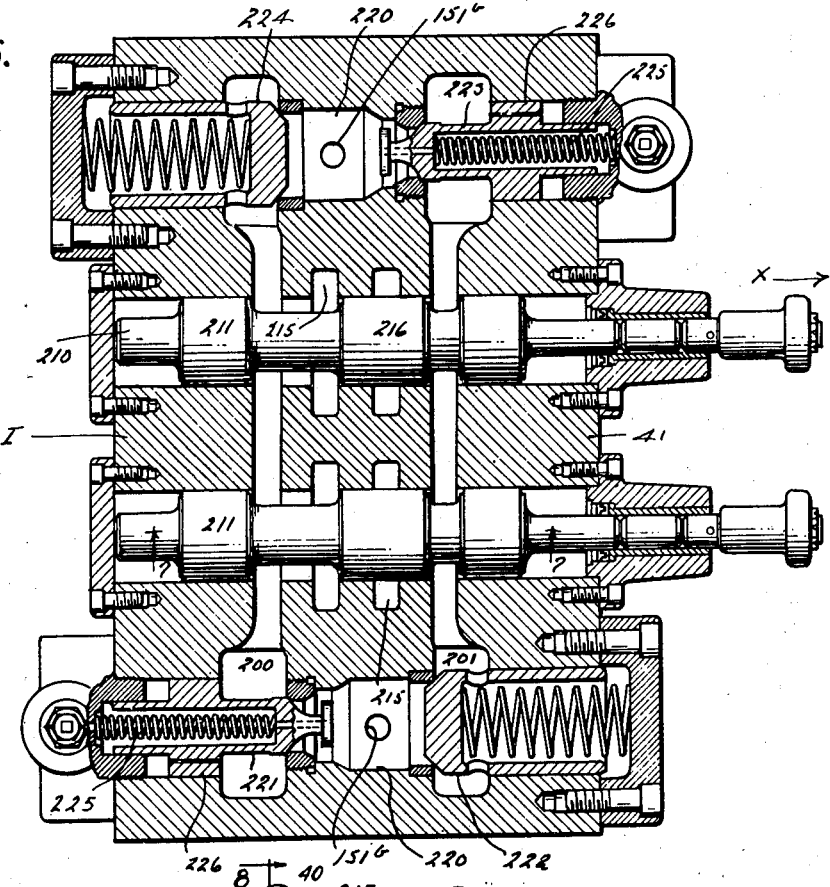
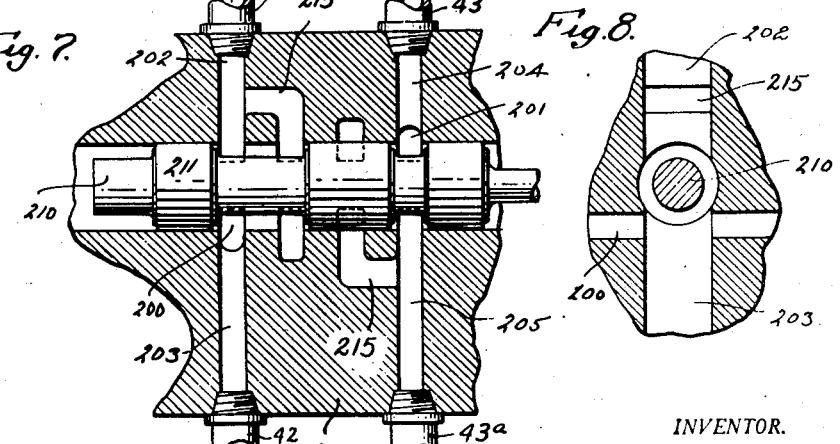
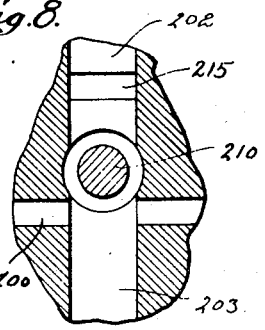
INVENTOR.
JAMES ROBINSON
BY
Ralph L. Tweedale
Attorney Patented Mar. 29, 1949

2,465,485

UNITED STATES PATENT OFFICE 2,465,485

HYDRAULIC DRIVE FOR HOISTS OR THE LIKE

James Robinson, Huntington Woods, Mich., assignor to Vickers Incorporated, Detroit, Mich., a corporation of Michigan Application January 25, 1947, Serial No. 724,325

5 Claims. (Cl. 60—97)

This invention has to do with a drive for hoists, or the like, and it is a general object of the invention to provide a simple, practical and dependable drive for a working element subject to varying loads or varying conditions of operation.

There are numerous situations in which work is performed at changing or varying speeds and where the loads or forces encountered vary. An example of such a situation is a hoist and a specific type or form of hoist presenting a typical example is the hoist of a well drilling rig. Such a hoist involves, primarily, a hoisting drum which handles a line which operates through suitable blocks to handle tools or equipment at the well. The tools or equipment that must be handled vary widely as to weight, and their movements vary from static conditions at some times to rapid movement at other times. The weights and strains involved or imparted to the hoisting drum may vary gradually between wide limits, or may fluctuate continuously within reasonably narrow limits. As a result of the severe and varying operating conditions that must be met in such an apparatus, it has been common to provide such apparatus with heavy or powerful prime movers and the skill and judgment of the operator has been relied upon to make the necessary adjustments or compensations. In general, the conditions are such that little or no attempt has been made to effect economy of power or efficiency in operation, as little has been possible in that direction with the common type of equipment heretofore used.

In its preferred form, my invention can be most advantageously applied to the hoist of a well drilling rig. When I employ the term hoist and when I refer to a hoisting drum, I mean to include and I refer to a mechanism or work element presenting the problems or general characteristics of a hoist or hoisting drum.

It is a general object of my present invention to provide a drive for a hoist which is a complete system of power generation and transmission involving the operation of the hoist from a prime mover which preferably involves a plurality of independently operating units. The present invention provides a drive which ordinarily varies or adjusts itself to load conditions so that it supplies the force necessary to handle the load in the most efficient or advantageous manner within the limits of the mechanism.

It is a general object of my present invention to provide a drive for a hoist, or the like, wherein there is a prime mover provided with a manual control operable to establish a given speed of operation for the prime mover and a governor which can be employed so the prime mover is maintained at a selected speed under varying load conditions. Through the control that I have provided for the prime mover, the drive or system for the transmission of power from the prime mover to the work is supplied with a constant such as a constant volume or flow of actuating fluid, even though pressure of such fluid may vary. By thus controlling and governing the prime mover, the operator is given adequate and effective control over the action of the apparatus.

Another object of my invention is to provide a drive of the general character referred to in which fluid is employed as the power transmitting medium and in which the fluid is employed to drive a motor which is governed so that its speed of operation automatically varies according to the load or torque conditions. With the mechanism of the present invention, fluid supplied by the action of a pump driven by the prime mover at a constant volume acts in the motor so that pressure is developed in the fluid up to the maximum available from the prime mover, and pump, and the speed of operation of the motor then varies in proportion to the load or the work imposed on it, so that the work is handled at the maximum speed possible with the power supplied under the set condition of the prime mover and pump.

Another object of the present invention to provide a hydraulic system or drive of the general character hereinabove referred to in which the fluid is handled in a closed circuit and a high pressure means is provided for supplying any leakage or loss of fluid that may occur in the system.

It is another object of my present invention to provide apparatus of the general character hereinabove referred to, in which there are variable displacement fluid pumps which make it possible for the operator to vary the speed of the driven fluid motors by varying displacement of the pumps while maintaining a constant or substantially constant pressure condition in the system. The apparatus is such that with constant pressures if volume is decreased, the torque will increase proportionately.

An important object of my invention is to provide a drive for the hoist of a well drilling rig which is entirely free of a mechanical clutch such as is now employed in the control of such devices and which is a common source of trouble and is inconvenient and slow to operate. I accomplish full control in both directions of operation without at any time disconnecting the prime mover from the work as occurs with a clutched drive.

Another object of the invention is to provide a hydraulic system of the general character hereinabove referred to in which the relief valve or pressure relief is provided so that regardless of the setting or operation of the prime mover or of the load or torque imposed at the work the system can never be loaded beyond a given pressure. With the drive of the present invention, pressure develops adequate to handle the work and the work is moved at a speed maximum for the pressure available, but if the load is excessive or greater than the drive can handle safely, the drive will not fail but will simply not move the work.

Another object of my invention is to provide a drive of the general character referred to involving multiple units, as for example, two independent prime movers and pumps operated thereby, and two work-handling motors with automatic controls therefor, and a master control whereby both the motors can be driven from fluid supplied by both of the pumps or either or both of the motors can be driven from either of the pumps, but under no conditions can but one of the motors be driven from both of the pumps.

By this control the apparatus is safe and dependable in that it is not subject to shut down because of failure of a prime mover, a pump, or a motor, and it is safe against the motors being driven at excessive speeds. In practice, the elements are related or balanced as to capacity so that the motors are operated at maximum safe capacity when powered from the two prime movers. By making it impossible to supply the power from both prime movers to but one motor, I eliminate the danger of overspeeding of the motors.

The various objects and features of my invention will be understood from the following detailed description of a typical preferred form and application of the invention, throughout which description reference is made to the accompanying drawings, in which:

Figure 1 is a side elevation of a typical installation involving the drive of the present invention showing a power driven hoist for use in handling well apparatus.

Figure 1A is a sectional view of a servo unit that may be used in the control provided by the invention.

Figure 2 is an enlarged plan view of a part of the mechanism shown in Figure 1, being a view taken substantially as indicated by line 2—2 on Figure 1.

Figure 6 is a sectional view of the control used in carrying out my invention.

Figure 7 is a sectional view taken substantially as indicated by line 7—7 on Figure 6.

Figure 8 is a sectional view taken on line 8—8 on Figure 7.

Figure 3:
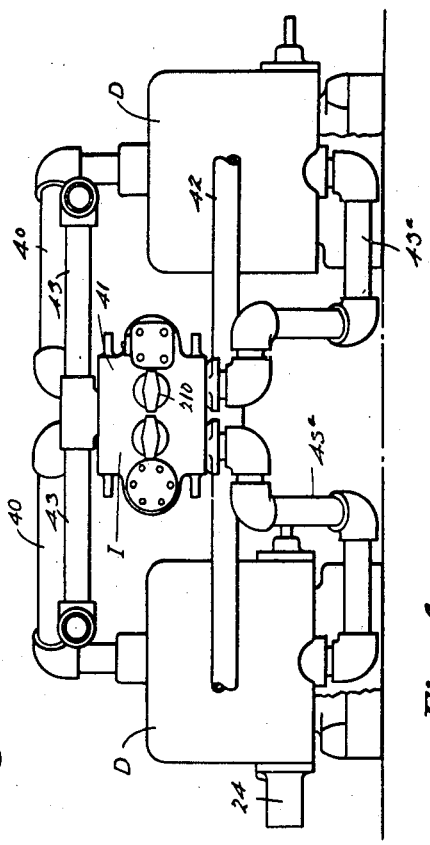
Figure 3 is a view taken substantially as indicated by line 3—3 on Figure 2.
Figure 4:
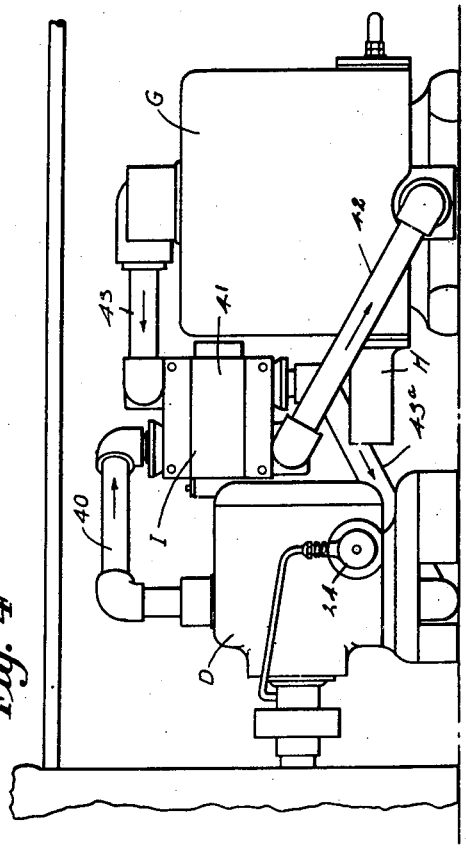
Figure 4 is an enlarged view of parts shown in Figure 1.

The drive of my present invention provides one or more prime movers for operating a work unit such as the hoisting drum of a well drilling rig, or the like. In the particular form of the invention shown in the drawings, I have illustrated an arrangement wherein there are two prime movers and a single hoisting drum. In this case the prime movers A are indicated as internal combustion engines and the hoisting drum B is a simple line-handling drum supported on a shaft 10.

The mechanism of my present invention, that is, the drive and control that I have provided between the prime movers A and the drum B, involves, generally, a control C for the prime movers, a pump D operated by each prime mover, a control E for the pumps, a single operator F for the controls C and E, motors G connected to drive the drum and operated by fluid from the pumps, automatic controls H for the motors and a master control I for the actuating fluid supplied to the motors by the pumps.

The prime movers A may be of any suitable form such as electric motors or engines. In the case illustrated I have indicated internal combustion engines. The two prime movers may be mounted and operated independently of each other except insofar as they are connected by means of the control means C, as hereinafter described.

The control means C shown in the diagram involves, generally, a mechanism connecting the operator F with the prime movers or engines so that they can be set to operating at any desired or selected speed. For example, if the engines are of the gasoline type, the carburetors or throttles can be set through the means C from the operator F so that the engines have a given speed of operation.

It will be apparent that various mechanical arrangements may be employed between the operator F and the throttles of the engine to accomplish the function just described. In the case illustrated, the operator F includes a hand wheel 11 fixed on a shaft 12 which is both rotatable and shiftable axially. The means C involves a gear 13 slidably keyed to the shaft 12 and suitable gearing and shafting connecting the gear 13 with the engine throttles.

Figure 5:
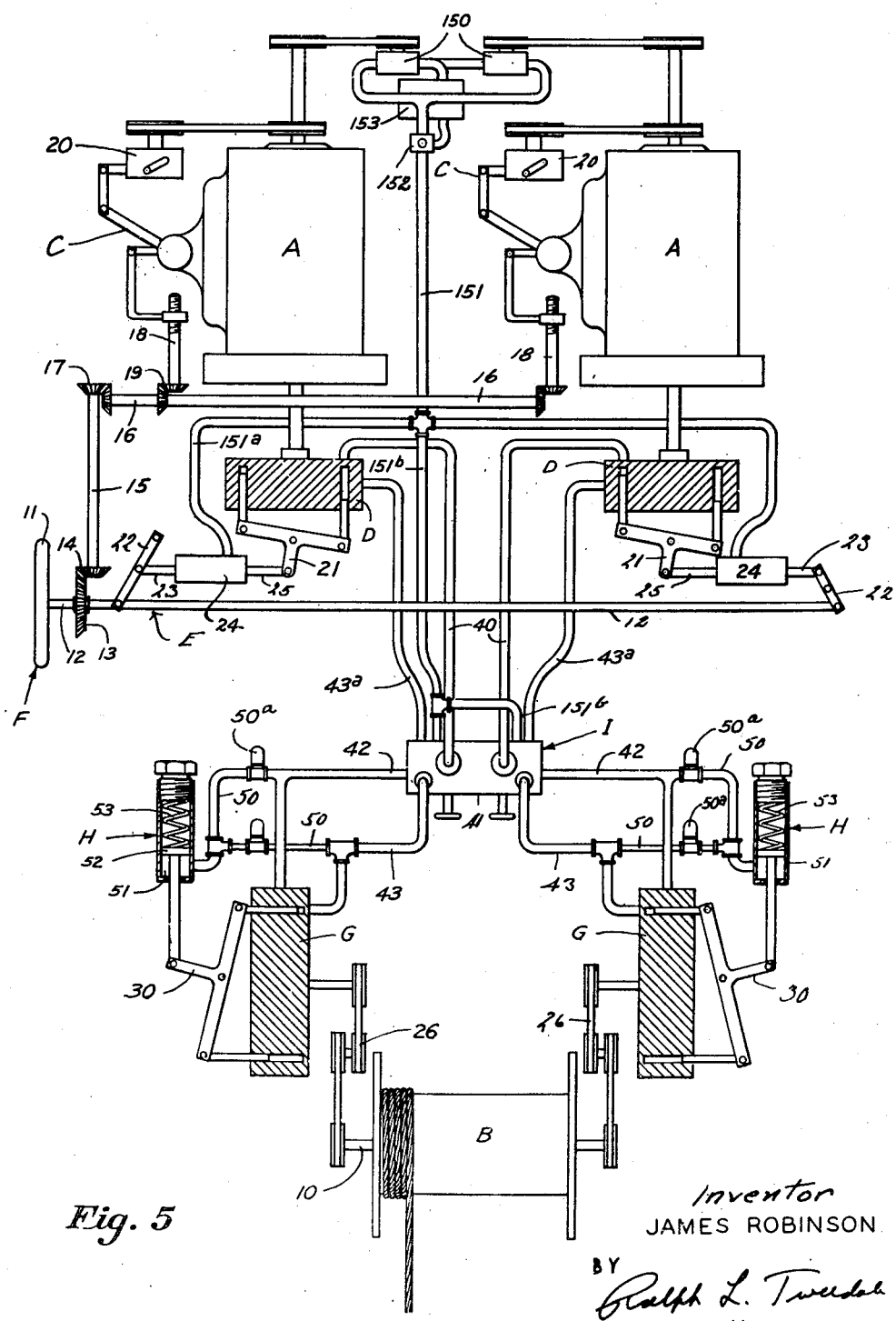
Figure 5 is a diagrammatic view illustrating the drive provided by my invention.

In the case shown in the diagram Figure 5, the gear 13 meshes with and drives a complementary gear 14 on a shaft 15. A shaft 16 extends between the engines and is driven from the shaft 15 through meshing gears 17. There is a shaft 18 at each engine driven from the shaft 16 through gears 19. Through the arrangement just described, rotation of the shaft 12 will operate the shafts 18 to move the engine throttles.

The control C includes, in addition to the mechanism above described, governors 20 which may be employed to operate independently to hold or maintain the engine speed as the load or resistance varies. Each engine has a speed governor 20 which may be set to hold the engine at the desired speed.

I have shown details of the means C in Figure 5, but have omitted them from the other figures of the drawings to avoid confusion.

The pumps D driven by the engines are preferably positive displacement pumps directly connected to the engines and are such as to be adjustable as to their output. In the preferred application of my invention, I employ pumps commonly known as wobble plate pumps, such pumps being piston type positive displacement pumps in which there is a wobble plate or variable element under control of a part such as a lever arm or line element 21. In this type of pump when the wobble plate or its corresponding element is in one position, for instance, a neutral position, the pump will operate without creating any pressure or displacing any fluid. As the wobble plate is varied or deflected from such neutral position, displacement increases causing increased flow or volume. The pressure developed by the pump will build up as resistance is encountered until it reaches maximum for the unit or the setting of the apparatus. By employing wobble plate type pumps, the operator can set the pumps to deliver any desired volume of fluid within the capacity of the pumps and as resistance is encountered the pressure will build up until it reaches maximum for the pumps, or the pressure at which the safety means is set, whichever is the lowest.

The means E for controlling the pumps or varying their action operates to vary the position of the wobble plates through operation of the levers 21. In the case illustrated, the variation or adjustment of the pumps is effected through axial shifting of the shaft 12. This motion is communicated to the levers 21 of the pumps by links 22 and rods 23 which operate servomotor units 24 connected to the levers 21 by rods 25. The servomotors are operated by fluid under pressure from pumps 150 driven from the engines and which operate to maintain fluid under pressure in a supply line 151. Lines 151a connect line 151 with the servomotors. A pressure governing valve 152 allows excess fluid from pumps 150 to return to the reservoir 153. In practice a system of drainage connections may be provided so that whenever there is slippage or leakage of fluid, that fluid is returned to the reservoir 153.

Each servomotor may involve or include a cylinder 154 which is held in a fixed position, a piston 155 operable in the cylinder 154 and connected to the shiftable element of the pump D, as through a suitable rod 25, and a valve member 156 operable in a valve chamber 157 provided within the piston 155. Fluid under pressure is maintained in the space 158 at one end of the piston and when the device is in the neutral position, fluid is trapped in the space 159 at the other end of the piston. When the valve 156 is moved to the right, a port 160 in communication with space 159 is put in communication with a port 161 in the valve which allows the fluid to escape to a chamber 165 at the end of the valve so the pressure in chamber 158 moves the piston 155 until the said ports are cut off or closed. When the valve is moved to the left port 170, which communicates with space 158, is put in communication with port 160 so fluid pressure develops in space 159. The effective area of piston 155 at space 159 is greater than that at space 158 so the piston 155 is moved to the left until the ports 170 and 160 are cut off.

The motors G operatively connected with the drum B, as by chain drives 26, or the like, are preferably mechanisms corresponding, generally, to the pumps, that is, they are positive displacement variable motors of capacities substantially equal to the capacities of the pumps. In the particular form illustrated in the drawings where wobble plate pumps are used, I employ wobble plate motors G and the wobble plate of each motor is under control of a control member 30. As the wobble plates of the motors are in a neutral position, there will be no flow through them and no rotation. As the plates are deflected or moved from the neutral position, flow will occur through the motors and as the deflection increases the speed decreases or the amount of fluid passed per revolution increases. In practice the units are not set to have a completely neutral position but rather have a minimum displacement when in the position that I refer to as "neutral." It will be understood, of course, that when the speed of rotation of the motors is slight, maximum torque may develop so that the torque delivered is high, whereas as the speed increases the torque will decrease, due to change in position of the wobble plates while pressure may remain constant.

In accordance with my invention, the pumps D and the motors G are connected by suitable fluid lines or conduits and the master control I. In the preferred arrangement, a line 40 connects each pump with master control I. Lines 42 connect the control I with the motors G. Motors G are connected to the pumps D by lines 43 and lines 43a connect the control I with the pumps D. When the mechanism is operating in one direction, which I will call the forward direction, the lines 40 deliver fluid under pressure from the pumps D to the control I and the lines 42 conduct fluid under pressure from the control I to the motors G. In this case the lines 43 conduct fluid from the motors G to the control I and the lines 43a conduct fluid from the control I back to the pumps D. When the mechanism is operating in reverse or in the opposite direction, the flow in the system is opposite to that just described, and fluid is delivered by the pumps D under pressure through the lines 43a to the control I, and the lines 43 conduct fluid under pressure from the control I to the motors G. In this case, lines 42 conduct fluid from the motors G back to the control I and lines 40 conduct fluid from the control I back to the pumps D.

My present invention provides a safety or relief means which governs the pressure that can develop in the system. This means may be incorporated in the control I as I will later describe.

The automatic control means H provided by my invention involves a construction whereby the control members 30 of the motors are operated or varied in response to the pressure developed in the fluid operating the motors. This pressure may be taken off at any suitable point in the system. In the particular case illustrated, control pressure lines 50 are taken off of the lines 42 and 43 and connect with the cylinders 51 to act on pistons 52 in the cylinders. Pressure operated valves 50a in lines 50 act to allow high pressure to enter the cylinders 51 and are only opened by pressure greater than that on the low pressure side of the system. Springs 53 normally yieldingly hold the pistons 52 in positions where the operating members 30 connected to the pistons locate the wobble plates of the motors in minimum deflected positions. In such minimum deflected positions, the wobble plates cause the motors to operate at a maximum speed. As pressure develops in the operating system between the pumps and the motors as a result of resistance to movement of the motors due to load on the drum B, that pressure is communicated through the pressure connections 50 and valves 50a so that the pistons 52 are moved against the resistance of the springs 53, thus causing the wobble plates to be moved toward the full capacity positions from their neutral positions. When the pressure decreases, valve 50a will be held open so long as the pressure is above a given amount and the spring will act to return the piston 52 displacing fluid from cylinder 51 through the open valve.

The master control I may vary widely in construction and formation. In the form of the invention illustrated, the master control involves, generally, a body 41 containing various chambers and ports and carrying check valves and control valves by which the pressures involved are subject to control. In general the lines 40 and 43 connect into the top of the body 41 while the lines 42 and 43a connect into the bottom of the body. Two main chambers 200 and 201 extend parallel to each other in the body 41. Each line 40 connected into the top of the body is joined to chamber 200 by a port 202, each line 42 connected into the bottom of the body is joined to chamber 200 by a port 203, each line 43 connected into the top of the body is connected to the chamber 201 by a port 204, and each line 43a connected into the bottom of the body is connected with chamber 201 by a port 205.

Two valve members are arranged transversely in the body 41 or in valve chambers which are transverse of the chambers 200 and 201 and extend between the chambers 200 and 201. One valve member controls one port 202 and one port 204 while the other valve member controls the other port 202 and the other port 204. The stems 210 of the valve members carry valve bodies 211 which control the ports 202 and valve bodies 216 which control the ports 204.

Passages or ports 215 join related ports 202 and 205 through or under control of valve 210. Each port 215 is normally closed adjacent port 205 by a valve body 216 while the valve bodies 211 and 216 are normally positioned so that the ports 202 and 204 are open. If the valve member is moved from the neutral position so valve body 211 closes port 202 while valve body 216 closes off port 204, then the passage or port 215 is opened forming a by-pass connection between the ports 202 and 205. Under this positioning of parts, ports 204 and 201 are cut off from port 205 so there is no return from the motor through ports 204 or 201 to port 205. At the same time the spaced parts of port 215 are connected by the valve 210 so flow can occur through ports 202, 215, 205 and 43a back to the intake of the pump. Assuming that the apparatus is being operated in the normal or forward direction, fluid under pressure from the pumps enters the ports 202. If it is desired to disconnect one of the pumps, the valve controlling the port 202 served by that pump is closed by moving the valve member out or in the direction indicated by the arrow X in Figure 6, with the result that the fluid from that pump instead of entering the chamber 200 goes through the by-pass 215 into port 205 which is handling the exhaust fluid. During such setting, the other valve may be left as shown in Figure 6, so that fluid from the other pump is distributed to the two motors G and is exhausted into the chamber 201 through the connections 43 to return to the pumps D through the ports 205 and connections 43a. Both lines 42 are always connected with chamber 200 and both lines 43 are always connected to chamber 201, so the output from both pumps can never be fed to only one motor. The cut-out action just described will occur when the mechanism is operated as described, regardless of the direction in which the fluid is circulating in the system.

In accordance with the preferred arrangement, a pressure relief means is provided to prevent excess pressure developing in the system. This relief system may involve two by-pass ports 220 connecting the chambers 200 and 201. A high pressure relief valve 221 controls flow from the chamber 200 into one of the by-pass ports 220 while a low pressure relief valve 222 controls flow from the port 220 into chamber 201. A second high pressure relief valve 223 controls flow from chamber 201 into the second or other by-pass 220 and a low pressure relief valve 224 controls flow from the second by-pass 220 into the chamber 200.

Each of the high pressure relief valves 221 and 223 is normally held closed by a spring 225 and has a piston 226 associated with it so that when pressure in the chamber which it controls exceeds a certain value, the valve opens allowing fluid to escape from that chamber into the by-pass 220 from which it readily escapes through the low pressure check valve 222 or 224 into the low pressure side of the system. By providing two by-pass ports 220 and relating the low pressure and high pressure valves to these ports oppositely, as shown in Figure 6, the system has effective relief means regardless of the direction of flow through the system.

In accordance with the preferred arrangement, the make-up feed or the fluid supplied to make up any leakage in the system is supplied from the line 151 through connections 151b, which connect into the by-pass ports 220 between the high and low pressure valves. Through this arrangement make-up fluid pressure is always maintained in the by-pass ports 220 and regardless of which way the fluid is being circulated through the apparatus the necessary make-up fluid will be introduced into the circuit or system past one of the low pressure valves. For example, if the system is being operated in the normal direction so that there is high pressure fluid in chamber 200, then the high pressure fluid will hold the low pressure valve 224 at the top of Figure 6 closed, but will open the low pressure valve 222 at the bottom of Figure 6, allowing make-up fluid to enter chamber 201 so it enters the pumps D through the lines 43a which connect with chamber 201.

The operation of the drive, as hereinabove described, is substantially as follows: The operator through the single manual operator F may set the engines or prime movers operating at a predetermined or selected speed, and he sets the output or potential of the pumps at the desired point. The operator may set the engines at an idling speed or at a maximum speed where they will develop a maximum amount of power, and he may set the pumps D to deliver a very small amount of fluid at the maximum pressure determined by the relief valve, or he may set them to deliver a maximum amount of fluid at a lower pressure. In other words, the operator sets the valves or essential factors of the apparatus and then the apparatus operates so that the load or torque encountered determines the pressure developed up to the maximum for the apparatus or as set by the relief means. For any given setting of the prime movers and pumps, a given amount of fluid will be delivered by the pumps with a certain pressure potential or possible pressure. This fluid is handled or passed through the master control to the motors G. Assuming a load to be on the drum B pressure immediately develops in the motors and connections 42 and consequently in the master control valve. This pressure is communicated by the connections 50 to the cylinders 51 and consequently the wobble plates of the motors are immediately moved to a position where the pressure is sufficient to cause movement of the motors and consequent lifting or movement of the load. The position taken by the motors is determined by the torque and varies as the torque varies, so that the apparatus operates at full capacity. If the load is greater than the drive will handle, the motors will not move but the fluid will simply be by-passed through the relief means in control I.

When the load has once been started in motion it, of course, will vary from a static load to a kinetic load or, as the mechanism operates, the load condition may vary due to many factors or circumstances. As such variables occur, the resistance or pressure in the hydraulic system will change and the means H will act to automatically vary or regulate the wobble plates of the motors so that the speed of the motors is automatically varied to keep the motors operating to handle load as fast as possible under the volume and pressure being supplied by the pumps. If under a given motor setting and pump setting the drive is not sufficient to pick up or move the load, the operator can either increase the speed of the motors and thus deliver more power by reason of a greater volume, or he may vary the setting of the pumps to deliver a smaller volume at a higher pressure, or he may tighten the relief. These factors being variable, the operator has considerable latitude in setting the drive to operate in the most satisfactory manner. For maximum operating torque, the prime movers would be set at full operating speed and the pumps would be set to deliver a maximum volume up to the maximum pressure set by the relief valve. If high torque is not desired under such conditions, but maximum speed is desired, the pumps would be set at maximum volume, in which case a susbtantial pressure would be obtained and also a maximum volume would be obtained.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A drive for a hoisting drum including, two prime movers, two variable positive displacement pumps one operated by each prime mover, two variable motors having driving connection with the drum, and a control including connections whereby fluid from both pumps is delivered to both motors, individual independently operable valves controlling the fluid delivered by the pumps whereby the flow from either pump can be by-passed without going to the motors.

2. A drive for a hoisting drum including two prime movers, two variable reversible positive displacement pumps, one operated by each prime mover, two variable reversible motors operatably connected to the drum, a control unit, fluid connections between each side of each pump and the unit and fluid connections between each side of each motor and the unit, the unit including two separate chambers one having connections from only one side of each pump connected thereto and connections from only one side of each motor connected thereto and the other having only connections from only the other side of each pump connected thereto and connections from only the other side of each motor connected thereto.

3. A drive for a hoisting drum including two prime movers, two variable reversible positive displacement pumps, one operated by each prime mover, two variable reversible motors operatably connected to the drum, a control unit, fluid connections between each side of each pump and the unit and fluid connections between each side of each motor and the unit, the unit including two separate chambers one having connections from only one side of each pump connected thereto and connections from only one side of each motor connected thereto and the other having only connections from only the other side of each pump connected thereto and connections from only the other side of each motor connected thereto, the unit having valve controlled by-passes whereby fluid from either pump to either chamber can be by-passed to the other chamber.

4. A drive for a hoisting drum including two prime movers, two variable reversible positive displacement pumps, one operated by each prime mover, two variable reversible motors operatably connected to the drum, a control unit, fluid connections between each side of each pump and the unit and fluid connections between each side of each motor and the unit, the unit including two separate chambers one having connections from only one side of each pump connected thereto and connections from only one side of each motor connected thereto and the other having only connections from only the other side of each pump connected thereto and connections from only the other side of each motor connected thereto, the unit having by-passes between the chambers and oppositely arranged pressure regulating valves controlling the by-passes so fluid at excess pressure in either chamber is by-passed to the other chamber.

5. A drive for a hoisting drum including two prime movers, two variable reversible positive displacement pumps, one operated by each prime mover, two variable reversible motors operably connected to the drum, a control unit, fluid connections between each side of each pump and the unit and fluid connections between each side of each motor and the unit, the unit including two separate chambers one having connections from only one side of each pump connected thereto and connections from only one side of each motor connected thereto and the other having only connections from only the other side of each pump connected thereto and connections from only the other side of each motor connected thereto, the unit having manually operated valve controlled by-passes whereby fluid from either pump to either chamber can be constantly by-passed to the other chamber.

JAMES ROBINSON.

REFERENCES CITED

The following references are of record in the file of this patent:

UNITED STATES PATENTS

| Number | Name | Date |
|---|---|---|
| 2,414,197 | Gignoux | Jan. 14, 1947 |